United States Patent Office 2,969,403
Patented Jan. 24, 1961

2,969,403
METHOD FOR THE PREPARATION OF CHLOROFLUOROCARBON OILS OR WAXES

Hans-Helmut Frey and Karl-Heinz Kahrs, Frankfurt am Main, Germany, assignors to Farbwerke Hoechst Aktiengesellschaft vormals Meister Lucius & Brüning, Frankfurt am Main, Germany, a corporation of Germany No Drawing. Filed Sept. 7, 1955, Ser. No. 533,025

Claims priority, application Germany Dec. 28, 1953

4 Claims. (Cl. 260—653.1)

Organic chemicals and substances consisting mainly of carbon and fluorine or carbon, chlorine and fluorine are becoming increasingly important in technical applications. Among these materials, different ranges of molecular weights are known including all intermediate stages between gaseous, liquid, oily, waxy and plastic states.

Various processes are known by which such products may be obtained from polymerization reactions of, for example, chlorotrifluoroethylene. If it is desired to control the polymerization in such a manner that there is obtained low molecular weight oils and/or waxes, it is very difficult to obtain preferentially one desired distillation fraction. Furthermore, undesired elements in the form of end groups are often introduced by chain transfer and/or chain transfer agents, for example by inclusion of hydrogen, which may make the application of the products obtained very difficult, or even impossible, because of their thermal as well as chemical instability, and the difficulty of stabilization.

Another method of obtaining the desired chlorofluorocarbon oils and/or waves, consists in cleaving higher molecular weight waxes and/or high molecular weight solid plastics, which consist of the elements carbon, fluorine, and chlorine, by chemical or thermal degradation to lower molecular weight fractions. The products obtained then consist only of carbon, fluorine and chlorine and contain no non-homogeneous end groups.

If this degradation is performed solely by heating the polymer, it is necessary to work at higher temperatures. Thus, U.S. Patent Nos. 2,420,222 and 2,543,530 describe a method of heating polychlorotrifluoroethylene at temperatures of 400–650° C. In return, the applied temperatures have the disadvantage that very low molecular weight compounds are the main product and monomeric chlorotrifluoroethylene is produced for the greater part, as may be seen in the examples listed in the disclosures mentioned above. This process would not be considered for the technical preparation of chlorofluorocarbon oils and/or waxes, because of the poor conversion to the desired products, but may well find use for a regeneration of chlorotrifluoroethylene from polychlorotrifluoroethylene which can no longer be used.

It has now been found that chlorofluorocarbon oils or waxes are produced as the main product from the cracking of the corresponding high molecular weight products, such as polychlorotrifluoroethylene, if there is added to the starting materials metals, in powder form, or metal powder mixtures or inorganic metal salts, particularly halides, or metal oxides at a temperature of 50–350° C., preferably 100–300° C., taking care to remove the cracked products under reduced pressure, i.e., a pressure of about one to 400 mm. Hg absolute. The reaction time may vary from a few seconds to several hours, or more.

For this method, powders, salts and oxides of metals with several valence states are particularly suitable. For example, the following may be used: copper, cobalt, iron, nickel, manganese, bronze, and brass in the form of powders; and the chlorides, sulfates and oxides of these metals.

Certain additives have already been recommended for the cracking of polychlorotrifluoroethylene, but only for the precaution of better heat distribution. However, it was not known that the reaction can be effected with the aid of the additives of this invention by vacuum cracking at lower temperatures, namely at temperatures of 50–350° C., preferably from 100–300° C. Thereby, by far the greater part of the polymer is obtained as chlorofluorocarbon oils and/or waxes and only small amounts of monomeric chlorotrifluoroethylene are produced.

The high yield of chlorofluorocarbon oils and/or waxes by vacuum cracking of polychlorotrifluoroethylene is all the more surprising, since monomer is obtained nearly exclusively from the vacuum decomposition of polytetrachloroethylene, as is indicated in U.S. Patent No. 2,406,153, and the yield of monomer decreases at lesser vacua. By analogy, it would be expected that mainly monomeric chlorotrifluoroethylene would be produced from vacuum cracking of polychlorotrifluoroethylene, instead of which, the yield of monomer is decreased and the formation of chlorofluorocarbon oils and/or waxes is favored, particularly under vacuum.

It is possible to produce a specific fraction by variation of the additives, the applied vacuum and the reaction temperature. Thus, there is obtained a highly viscous oil to a semi-solid wax as the main product of a very high vacuum operation and mobile oils in a lesser vacuum.

The amounts of additives may be maintained within a wide range. For economic reasons, it is desirable to admix as little as possible of the additives. Generally, an addition of 5 to 50 percent by weight suffices to achieve the desired effect but smaller or larger amounts may be added.

Furthermore, it has been found that colorless chlorofluorocarbon oils and/or waxes may be obtained by the addition of $CoF_3$. This is all the more surprising, since other metal fluorides, such as for example manganese trifluoride, do not produce colorless products but equal approximately the effect of $CoF_2$, i.e., they produce more or less strongly discolored distillates in the processes carried out according to this invention.

The further advantage of cracking with $CoF_3$ is the residueless decomposition of polychlorotrifluoroethylene with the deposition of pure $CoF_2$. By cracking with other additives than $CoF_3$, some amounts of carbon remain as residue, so that the metal powders, metal halides or oxide additives accumulate in an impure and clinkery state and can be worked up for renewed use only with difficulty. On the other hand, the residue from cracking with $CoF_3$ may be isolated as a loose, pink colored powder, which may be refluorinated to $CoF_3$ without further processing or purification.

It is naturally difficult to isolate from these chlorofluorocarbon oils or waxes uniform, chemically defined species, since a great number of chlorofluoro compounds are present. The situation may be compared to petroleum. Thus, there is obtained a continuous boiling point spectrum, beginning at room temperature at atmospheric pressure up to 300° C., at a pressure of 5 mm. Hg absolute. The fractionation is made even more difficult by the instability due to thermal stresses during the distillation, halogen being split off thereby.

The cracking of polychlorotrifluoroethylene may be effected continuously or batch-wise, adding the additives before or during the process.

Due to the process of formation and also due to the distillation these fluorochlorocarbon oils or waxes contain one or more double bonds, which may be recognized qualitatively from the color, which darkens from light yellow with a low number of double bonds to the darkest brown-black with several. The double bond content may be determined quantitatively by the Iodine Number.

These chlorofluorocarbon oils or waxes are useful in chemical reactions due to their chemical instability, although on the other hand, the saturated chlorofluorocarbon oils or waxes distinguish themselves particularly by their chemical inertness to chemically active reagents and are capable of wide-spread application on the basis of these outstanding properties. For example, the subject of application Serial No. 452,707, filed August 27, 1954, now abandoned, is the oxidation of such chlorofluorocarbon oils or waxes to the corresponding chloroflurocarboxylic acids.

If it is desired to use the chlorofluorocarbon oils or waxes as such, they must be stabilized. This is done by post-fluorination with metal fluorides or halogen fluorides, the oils becoming completely colorless and the iodine number decreasing to zero. The chlorofluorocarbon oils or waxes stabilized in this manner may be used as plasticizers for polychlorotrifluoroethylene; furthermore, they are useful as high grade lubricants for corrosive substances, as special transformer oils, as heat and hydraulic fluids, as reaction media for chemical conversions and polymerizations and the like.

*Example 1*

2000 grams of polychlorotrifluoroethylene (NST 300), mixed with 200 grams of copper powder were heated slowly in a stainless steel flask at a pressure of 10 mm. Hg absolute by application of electric heating. Decomposition began with formation of fog at a temperature of about 50° C. Yellow to yellow-brown colored oils began to accumulate in the receiver from about 100° C., giving a constant distillate in the temperature range of about 150–250° C. In order to drive out the last fractions of cracked products, it is necessary to raise the temperature at the end to about 300° C.

1245 grams of the highly viscous chlorofluorocarbon oil were collected in the receiver. 250 grams by weight of gray residue remained in the flask, sintered to clumps by the carbonization products. Further distillation of the crude material was difficult, because of the thermal instability, since gases were formed by cleavage of halogen and by production of further double bonds, so that the pressure and, therefore, the boiling point underwent strong variation during the distillation. The last fraction of the high boiling chlorofluorocarbon oils cracked to lower fractions during the distillation, subjecting the boiling points to further strong variations at the end of the distillation. A carbonaceous residue remained. Approximately 30 percent of the crude product was obtained, up to 170° C. at a pressure of 5 mm. Hg absolute including the gases dissolved in the oil; 22 percent of the chlorofluorocarbon oils distilled between 170–230° C. and 36 percent between 230–300° C. The remainder consisted of a carbonized residue. The last high boiling fraction was highly viscous and semi-solid. It was colored dark brown and cleaved halogen, as was recognized from the odor.

*Example 2*

500 grams of chlorofluorocarbon oils were obtained by cracking, in a glass flask, 1000 grams of polychlorotrifluoroethylene (NST 300) mixed with 100 grams of cuprous chloride at a temperature of 100–250° C. at a pressure of 20 mm. Hg absolute. Of the crude product, 25 percent distilled up to 170° C., 21 percent from 170–230° C. and 43 percent from 230–300° C., at a pressure of 5 mm. Hg absolute. Carbonaceous slag remained as a residue.

*Example 3*

1530 grams of liquid oils, of which 60 percent distilled between 170–300° C. at a pressure of 5 mm. Hg absolute were obtained by mixing 200 grams of nickel chloride with 2000 grams of polychlorotrifluoroethylene (NST 300) and cracking in a stainless steel flask at a temperature of 100–250° C. at a pressure of 25 mm. Hg absolute.

*Example 4*

A powdered mixture of 150 grams of polychlorotrifluoroethylene (NST 300) and 15 grams of ferric oxide was heated in a glass flask at a pressure of 50 mm. Hg absolute at temperatures starting with 100° C. and ending at 250–300° C. to distill the last fractions of liquid oils. 85 grams of chlorofluorocarbon oils were obtained of which 17 percent distilled between 170–230° C. at a pressure of 5 mm. Hg absolute.

*Example 5*

50 grams of polychlorotrifluoroethylene (NST 300) were ground with 25 grams of cobalt trifluoride and mixed well. The mixture was heated in a glass flask to temperatures of 100–250° C. at a pressure of 10 mm. Hg absolute. 47.5 grams of a white, semi-solid wax were obtained, of which 55 percent distilled in the range of 230–300° C. at a pressure of 5 mm. Hg absolute. 22 grams of a rose-red powder remained as a residue, which analysis indicated to be cobalt difluoride. This may be refluorinated to cobalt trifluoride without further purification or processing.

The chlorofluorocarbon wax is chemically and thermally stable. It contains 50 to 51 percent fluorine, about 29 percent chlorine and about 20 percent carbon and is practically free of hydrogen. Since it is completely colorless and since the iodine number is extremely low, it contains practically no double bonds.

*Example 6*

800 grams of a white chlorofluorocarbon wax of which 65 percent distilled between 170–300° C. at a pressure of 5 mm. Hg absolute were obtained by cracking of 1000 grams of polychlorotrifluoroethylene (NST 300) and 500 grams of cobalt trifluoride in a stainless steel flask at temperatures of 100–250° C. at a pressure of 10 mm. Hg absolute. 226 grams of a rose-red powder remained in the flask and were refluorinated to cobalt trifluoride.

*Example 7*

100 grams of polychlorotrifluoroethylene (NST 300) and 50 grams of manganese trifluoride, were mixed in a glass flask at temperatures of 100–300° C. at a pressure of 10 mm. Hg absolute, and 50 grams of a dark yellow oil were obtained of which 40 percent distilled between 170–300° C., at a pressure of 5 mm. Hg absolute. 43 grams of a gray powder remained as residue, consisting mainly of manganese difluoride.

*Example 8*

If, however, 100 grams of polychlorotrifluoroethylene (NST 300) are cracked in a glass flask at a pressure of 6 mm. Hg absolute under the same conditions, but without addition of salts as described in the above examples, slight vapors appear first at an internal temperature of 270° C., becoming stronger from 300° C., so that the pressure increases to 15 mm. Hg absolute. Chlorofluorocarbon oil collects in the receiver only above 350° C. In the temperature range of 350–450° C., the decomposition of polychlorotrifluoroethylene continues vigorously, further decreasing the pressure. After complete decomposition, there is obtained 43 grams of a yellow, highly viscous oil.

*Example 9*

10 grams of anhydrous copper sulfate were mixed in a mortar with 90 grams of high polymer polychlorotrifluoroethylene.

The mixture was cracked in a glass flask at a low pressure of 85–100 mm. Hg absolute. Cracking temperature: 280–350° C. 65 grams of an oil-wax mixture as raw product were obtained.

After fractionation the following products were obtained:

| Fraction | B.P. (4 mm. Hg), °C. | Consistency | Conversion,[1] Grams | Molecular Weight |
|---|---|---|---|---|
| A | 50–100 | waterclear fluid | 7 | 470 |
| B | 100–150 | yellow oil | 8 | 510 |
| C | 150–200 | do | 9 | 770 |
| D | 200–250 | grease-like | 19 | 890 |
| E | 250–290 | yellow wax | 17 | 1,250 |
| | | | 60 | |

[1] Reference to polychlorotrifluoroethylene used.

| Analysis | Fluorine, percent | Chlorine, percent | Carbon, percent | Hydrogen | Hydrogenated iodine number |
|---|---|---|---|---|---|
| Fraction C | 47.08 | 30.66 | 20.12 | below 0.3% | 122.8 |
| Fraction D | 46.81 | 30.13 | 19.87 | do | 92.2 |
| Fraction E | 45.94 | 30.45 | 19.15 | do | not measured |

*Example 10*

The procedure was the same as described in Example 9, only in lieu of the pressure therementioned, a pressure of 9 mm. Hg absolute was used. In this way 85 grams of raw products were obtained.

The oil-wax mixture was decomposed in the following fractions:

| Fraction | B.P. (4 mm. Hg), °C. | Consistency | Conversion,[1] Grams | Molecular Weight |
|---|---|---|---|---|
| A | 50–100 | colorless fluid | 8 | 490 |
| B | 100–150 | do | 9 | 640 |
| C | 150–200 | yellowish fluid | 11 | 745 |
| D | 200–250 | grease-like | 18 | 930.0 |
| E | 250–300 | yellow wax | 18 | 1,170 |
| F | 300–350 | brown wax | 13 | not measured |
| | | | 77 | |

[1] Reference to polychlorotrifluoroethylene used.

| Analysis | Fluorine, percent | Chlorine, percent | Carbon, percent | Hydrogen | Hydrogenated iodine number |
|---|---|---|---|---|---|
| Fraction C | 47.42 | 30.10 | 20.68 | below 0.3% | 116.0 |
| Fraction D | 48.00 | 29.89 | 20.59 | do | 92.0 |

*Example 11*

50 grams of anhydrous copper sulfate were mixed in a mortar with 50 grams of high polymer polychlorotrifluoroethylene. The mixture was cracked in a glass flask at a pressure of 9 mm. Hg absolute. Cracking temperature: 280–350° C. By this treatment 45 grams of raw oil were obtained. By fractionation the following fractions were obtained:

| Fraction | B.P., °C. | Consistency | Conversion[1] Grams | Molecular Weight |
|---|---|---|---|---|
| A | 23 mm.—34–100° | colorless oil | 4 | 450 |
| B | 18 mm.—100–150° | light yellow oil | 7 | 500 |
| C | 17 mm.—150–200° | yellow oil | 7 | 640 |
| D | 13 mm.—200–250° | do | 9 | 800 |
| E | 18 mm.—250–310° | do | 14 | 1,800 |
| | | | 41 | |

[1] Reference to polychlorotrifluoroethylene used.

| Analysis | Fluorine, percent | Chlorine, percent | Carbon, percent | Hydrogen, percent | Hydrogenated iodine number |
|---|---|---|---|---|---|
| Fraction C | 49.10 | 31.20 | 20.16 | below 0.3 | 109.3 |
| Fraction D | 48.84 | 29.80 | 20.55 | do | 84.5 |

*Example 12*

30 grams of anhydrous copper sulfate were mixed in a mortar with 70 grams of high polymer polychlorotrifluoroethylene. The mixture was cracked in a glass flask at a pressure of 9 mm. Hg absolute. Cracking temperature: 280–350° C. 65 grams of an oil-wax mixture as raw product were obtained. After fractionating, the following products were obtained:

| Fraction | B.P. (4 mm. Hg), °C. | Consistency | Conversion[1] Grams | Molecular Weight |
|---|---|---|---|---|
| A | 38–100 | colorless oil | 9.5 | 450 |
| B | 100–150 | light yellow oil | 8 | 600 |
| C | 150–200 | yellow oil | 12.5 | 780 |
| D | 200–250 | do | 15.5 | 1,020 |
| E | 250–315 | yellow wax | 13.0 | 1,150 |
| | | | 58.5 | |

[1] Reference to polychlorotrifluoroethylene used.

| Analysis | Fluorine, percent | Chlorine, percent | Carbon, percent | Hydrogen, percent | Hydrogenated iodine number |
|---|---|---|---|---|---|
| Fraction C | 48.70 | 30.20 | 20.82 | below 0.3 | 99.0 |
| Fraction D | 48.45 | 29.90 | 21.02 | do | 71.5 |

*Example 13*

5 grams of anhydrous copper sulfate were mixed in a mortar with 95 grams of high polymer polychlorotrifluoroethylene. The mixture was cracked in a glass flask at a pressure of 5–7 mm. Hg absolute. Cracking temperature: 280–350° C. 74 grams of an oil-wax mixture were obtained. After fractionation, the following products were obtained:

| Fraction | B.P., °C. | Consistency | Conversion,[1] Grams | Molecular Weight |
|---|---|---|---|---|
| B | 1 mm.—100–150° | colorless oil | 3.5 | 480 |
| C | 13 mm.—150–200° | do | 8.5 | 540 |
| D | 15 mm.—200–250° | light yellow oil | 8.5 | 650 |
| E | 15 mm.—250–300° | yellow wax | 18 | 880 |
| F | 5 mm.—300–350° | do | 26 | 1,050 |
| | | | 64 | |

[1] Reference to polychlorotrifluoroethylene used.

| Analysis | Fluorine, percent | Chlorine, percent | Carbon, percent | Hydrogen, percent | Hydrogenated iodine number |
|---|---|---|---|---|---|
| Fraction D | 48.24 | 30.57 | 20.21 | below 0.3 | 110.5 |

*Example 14*

30 grams of anhydrous copper sulfate were mixed in a mortar with 70 grams of a copolymer of chlorotrifluoroethylene and vinylidene fluoride (chlorine content of the copolymer=28.18 percent, corresponding to a molar proportion of chlorotrifluoroethylene:vinylidene fluoride=8:1). The mixture was cracked in a glass flask at a pressure of 9 mm. Hg absolute. Cracking temperature: 280–350° C. 64 grams of raw cracking-oil were obtained, which yielded during fractionation the following products:

| Fraction | B.P., ° C. | Consistency | Conversion,[1] Grams | Molecular Weight |
|---|---|---|---|---|
| A | 12 mm.—50–100° | green yellow oil | 10 | 420 |
| B | 10 mm.—100–150° | ----do---- | 10.5 | 650 |
| C | 10 mm.—150–200° | ----do---- | 11 | 830 |
| D | 9 mm.—200–250° | ----do---- | 21 | 1,010 |
| E | 9 mm.—250–275° | ----do---- | 4 | 1,100 |
|  |  |  | 56.5 |  |

[1] Reference to polymerizate.

| Analysis | Fluorine, percent | Chlorine, percent | Carbon, percent | Hydrogen, percent | Hydrogenated iodine number |
|---|---|---|---|---|---|
| Fraction C | 49.40 | 27.50 | 22.81 | 0.84 | 82.8 |
| Fraction D | 49.64 | 26.72 | 22.50 | 0.60 | 56.4 |

*Example 15*

30 grams of anhydrous copper sulfate were mixed in a mortar with 70 grams of a copolymer consisting of 98 parts by weight of chlorotrifluoroethylene and 2 parts by weight of 1,1,1-trifluoropropene ($CF_3$—$CH=CH_2$), ascertained by analysis with infra-red exposure on pressed foils of the polymerisate.

The mixture was cracked in a glass flask at a pressure of 7 mm. Hg absolute. Cracking temperature: 280–350° C. 66 grams of an oil-wax mixture as a raw product were obtained. After fractionation the following products were obtained:

| Fraction | B.P. (7 mm. Hg), ° C. | Consistency | Conversion,[1] Grams | Molecular Weight |
|---|---|---|---|---|
| A | 64–150 | bright oil | 7.5 | 423 |
| B | 100–150 | yellow oil | 8 | 594 |
| C | 150–200 | ----do---- | 11 | 813 |
| D | 200–250 | ----do---- | 15 | 1,130 |
| E | 250–300 | yellow wax | 16.5 | 1,130 |
|  |  |  | 58.0 |  |

[1] Reference to polymerizate.

| Analysis | Fluorine, percent | Chlorine, percent | Carbon, percent | Hydrogen, percent | Hydrogenated iodine number |
|---|---|---|---|---|---|
| Fraction C | 48.85 | 29.17 | 20.99 | below 0.3 | 106 |
| Fraction D | 48.86 | 28.80 | 20.88 | ----do---- | 88 |

This application is a continuation-in-part of copending application Serial No. 478,176, filed December 28, 1954, now abandoned.

We claim:

1. A method for the preparation of liquid low molecular weight polymers consisting essentially of carbon, fluorine, and chlorine, which comprises thermally decomposing high molecular weight polymers consisting essentially of carbon, fluorine, and chlorine at reduced pressure and at a temperature in the range of about 50 to 350° C. in the presence of an additive selected from the group consisting of copper sulfate and ferric oxide.

2. A method for the preparation of liquid low molecular weight polymers consisting essentially of carbon, fluorine, and chlorine, which comprises thermally decomposing high molecular weight polymers consisting essentially of carbon, fluorine, and chlorine at reduced pressure and at a temperature in the range of about 50 to 350° C. in the presence of anhydrous copper sulfate.

3. A method for the preparation of liquid low molecular weight polymers comprising carbon, fluorine, chlorine and hydrogen, which comprises thermally decomposing high molecular weight polymers comprising carbon, fluorine, chlorine and hydrogen at reduced pressure and at a temperature in the range of about 50 to 350° C. in the presence of an additive selected from the group consisting of copper sulfate and ferric oxide.

4. A method for the preparation of liquid low molecular weight polymers comprising carbon, fluorine, chlorine and hydrogen, which comprises thermally decomposing high molecular weight polymers comprising carbon, fluorine, chlorine and hydrogen at reduced pressure and at a temperature in the range of about 50 to 350° C. in the presence of anhydrous copper sulfate.

References Cited in the file of this patent

UNITED STATES PATENTS

| 2,436,069 | Joyce | Feb. 17, 1948 |
| 2,543,530 | Kropa | Feb. 27, 1951 |
| 2,664,449 | Miller | Dec. 29, 1953 |